(12) United States Patent
Bae et al.

(10) Patent No.: US 9,834,457 B2
(45) Date of Patent: Dec. 5, 2017

(54) METHOD FOR SOLIDIFYING FLOATING OIL IN FOOD WASTE WATER

(71) Applicants: Hee Dong Bae, Gyeonggi-do (KR); SUDOKWON LANDFILL SITE MANAGEMENT CORPORATION, Incheon (KR)

(72) Inventors: Hee Dong Bae, Gyeonggi-do (KR); Young Rog Kim, Gyeonggi-do (KR); Seok Jun Park, Incheon (KR); Jun Ho Cho, Incheon (KR); Jin Hyung Lee, Incheon (KR)

(73) Assignees: Hee Dong Bae, Ansan-si, Gyeonggi-do (KR); SUDOKWON LANDFILL SITE MANAGEMENT CORPORATION, Incheon (KR)

( * ) Notice: Subject to any disclaimer, the term of this patent is extended or adjusted under 35 U.S.C. 154(b) by 792 days.

(21) Appl. No.: 14/358,734

(22) PCT Filed: Nov. 15, 2012

(86) PCT No.: PCT/KR2012/009682
§ 371 (c)(1),
(2) Date: May 16, 2014

(87) PCT Pub. No.: WO2013/073871
PCT Pub. Date: May 23, 2013

(65) Prior Publication Data
US 2014/0311989 A1 Oct. 23, 2014

(30) Foreign Application Priority Data
Nov. 17, 2011 (KR) .................. 10-2011-0120485

(51) Int. Cl.
C02F 1/40 (2006.01)
C10L 5/42 (2006.01)
(Continued)

(52) U.S. Cl.
CPC ............ C02F 1/40 (2013.01); B01D 17/0202 (2013.01); C10L 5/363 (2013.01); C10L 5/42 (2013.01);
(Continued)

(58) Field of Classification Search
CPC ........ B01D 17/0202; C02F 1/40; C02F 11/10; C10L 5/363; C10L 5/42; C10L 7/02;
(Continued)

(56) References Cited

U.S. PATENT DOCUMENTS

2005/0247647 A1* 11/2005 Hills .................... C02F 1/38
210/787
2011/0091953 A1* 4/2011 Bolin .................... C02F 9/00
435/167
(Continued)

FOREIGN PATENT DOCUMENTS

JP 10-130668 A 5/1998
JP 2001-262167 A 9/2001
(Continued)

Primary Examiner — Bobby Ramdhanie
Assistant Examiner — Donovan C Bui-Huynh
(74) Attorney, Agent, or Firm — Rabin & Berdo, P.C.

(57) ABSTRACT

The invention relates to a method for solidifying a floating fat and oil in a food waste water, the method being capable of solidifying floating oil by uniformly mixing and aging the floating oil having a high content of water generated during the process of treating high concentration waste water generated during a food waste treatment process or generated from a food company, slaughterhouse and the like.

5 Claims, 1 Drawing Sheet

(51) Int. Cl.
  *C10L 7/02*    (2006.01)
  *B01D 17/02*   (2006.01)
  *C10L 5/36*    (2006.01)

(52) U.S. Cl.
  CPC ................ *C10L 7/02* (2013.01); *Y02E 50/10* (2013.01); *Y02E 50/30* (2013.01)

(58) Field of Classification Search
  CPC . C10L 1/32; Y02E 50/10; Y02E 50/30; B09B 3/00
  See application file for complete search history.

(56) References Cited

U.S. PATENT DOCUMENTS

2012/0210467 A1\*  8/2012  Barton ............... C11D 3/38627
                         800/293
2015/0017313 A1\*  1/2015  Zeeck ....................... B29B 9/14
                          426/623

FOREIGN PATENT DOCUMENTS

JP   2009-197204 A  9/2009
KR   10-0661624 B1  12/2006

\* cited by examiner

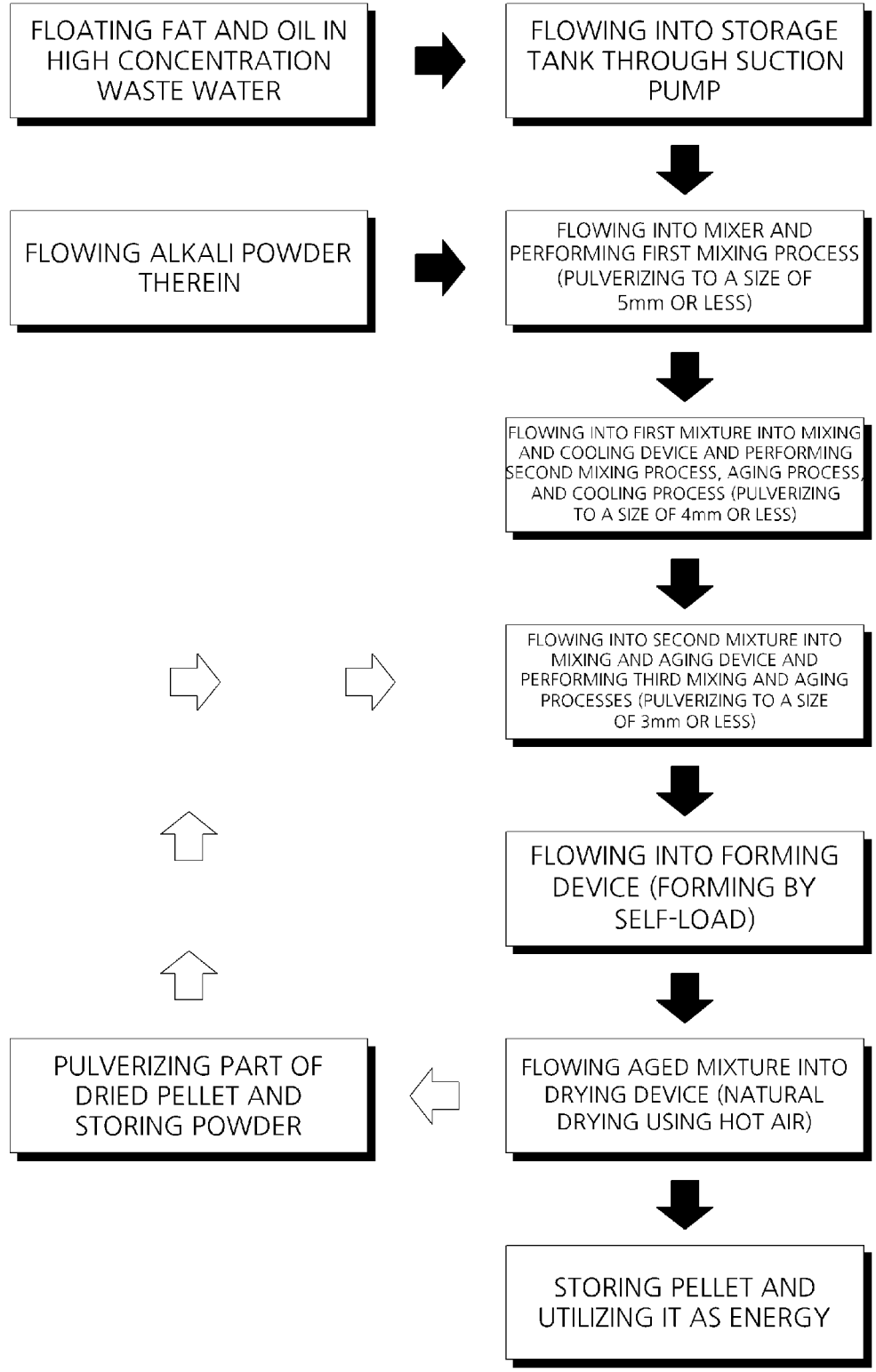

METHOD FOR SOLIDIFYING FLOATING OIL IN FOOD WASTE WATER

TECHNICAL FIELD

The invention relates to a method for solidifying a floating fat and oil in a food waste water, the method being capable of solidifying the floating fat and oil by uniformly mixing and aging the floating fat and oil having a high content of water generated during the process of treating high concentration waste water generated during a food waste treatment process or generated from a food company, slaughterhouse and the like and more particularly, to a method for solidifying a floating fat and oil in a food waste water in that it induces even mixing and aging of a floating fat and oil and an alkali powder in the inside of a mixer for mixing the floating fat and oil floated in a high concentrated organic wastewater of a food waste disposal plant with the alkali powder to be solidified, a mixing and cooling device for second mixing and naturally cooling them, and a mixing and aging device for third inducing the mixing and aging thereof to be evenly mixed, so that a solidified pellet having a structurally fine tissue is obtained, thereby maximizing the utilization of the fuel of the renewable energy through the solidified pellet and easily performing the solidification of the floating fat and oil floated in the waste water and the separation with the moisture; the mixer, the mixing and cooling device, and the mixing and aging device for inducing the mixing and aging thereof are formed in a horizontally direction respectively, so that the mixing and aging materials are is transferred in the horizontal direction and the moisture thereof is evenly evaporated through the principle of air circulation and air dynamics; at this time, on one side of the upper side of the mixer, the mixing and cooling device, and the mixing and aging device, a ventilator for inducing a sweating is connected to a ventilation pipe, thereby maximizing the evaporation effect of the moisture of the mixing and aging materials and easily discharging the moisture thereof to outside; a double fine cutting screw and a grinding roller, in which a plurality of blades is protruded, are formed inside the mixer, the mixing and cooling device, and the mixing and aging device respectively, so that the mixing materials are finely pulverized in order to be mixed and evenly and uniformly mixed and aged, thereby improving the pulverization efficiency thereof; it is dried through the indirect heating of a hot air at a predetermined temperature supplied through hot air inflow pipes, thereby preventing a moisture condensation phenomenon; it induces the flow of the air in the horizontal direction, thereby more improving the drying efficiency of the pellets without a separate electric heating appliance etc.; and a discharging adjustable valve is formed at the outlet of the drying device, so that the drying speed and time of the dried pellets, which are discharged from the drying device, can be freely adjusted.

BACKGROUND ART

In general, the bulk of the food waste or the bulk of the plant waste generated in the plant etc. are reclaimed or treated by methods such as an incineration and a dumping and so on.

However, in case of the treating method such as the landfill, the incineration, or the dumping etc., it requires a great landfill cost and a great landfill site. Thus, there is a big problem in that it causes a secondary environmental pollution.

In particular, an effluent as a high concentration wastewater is generated during the treatment process of the food waste. Since it is more difficult to process the effluent, the bulk of the effluent has been treated by an ocean dumping manner. However, according to a London convention, it is going to fundamentally ban the ocean dumping by the Korean government. Accordingly, it is expected to cost the tremendous processing expense.

Meanwhile, a waste disposal method and a solid fuel manufactured by using the same capable of perfectly recycling the waste by dewatering the food waste, mixing it with combustible additives to manufacture a solid fuel, and purifying the discharging water generated from the manufacturing process through the wastewater treatment process has been well-known in Korea Patent Registration No. 10-0661624.

That is, the disposal method of the waste includes a first waste dewatering process for dewatering the waste, a sorting process of sorting it, a crushing process, a second dewatering process, and a pulverizing process of finely pulverizing to a size of a diameter 5 mm or less, a mixing process of mixing a catalyst agent including amorphous carbonaceous powder, calcium oxide based additive, sodium based additive and solid acid catalyst with the obtained waste, drying process of drying the mixed waste until the moisture content reaches 20-30%, a second mixing process of mixing a solution obtained by mixing and melting waste, organic binder and sludge with the mixing waste having the moisture content of 20-30%, a molding process of molding a treated material obtained through the second mixing process into a solid fuel through a molding machine, a chemically and biologically treating process of chemically treating and biologically treating discharging water of waste discharged through the dewatering processes in an aerobic tank and an anoxic tank, and purifying and discharging process of purifying the discharging water through advance water treatment and discharging sludge after purifying the discharging water treated through the first step in an organic tank.

Accordingly, as described above, the food waste is dewatered, so that the moisture is set to an optimal level. Also, the amorphous carbonaceous powder and the catalyst etc. are putted into the waste to be polymerized, so that the combustible solid fuel can be produced. Moreover, the discharging water generated from the manufacturing process is purified through the chemical and biologically treating processes, so that it can recycle the food waste and the discharging water can be purified and discharged.

However, in case of the above food waste disposal method, since the water content thereof is high due to the characteristic of the food waste and large amounts of fluidal fat elements are contained in the waste, it is extremely difficult to effectively dewater the waste. Also, on account of the fluidity of the waste, it is very difficult to simply pulverize and solidify the waste through the mixing process of mixing the oxide based additive and the sodium based additive such as liquidity quicklime, slaked lime, and sodium hydroxide, etc. thereto Further, since the moisture of the waste mixture generated during the mixing and drying processes of the waste water is not easily discharged owing to the air having the moisture inside the drying device, the drying efficiency thereof is extremely lowered. Also, since the moisture is not evenly dried inside the dried waste, there is a problem in that it is difficult to recycle the waste as a solid fuel.

In addition, in case of the above food waste disposal method, since the sewage sludge and the food waste having a low fat and oil content are solidified, there is a problem in that it is impossible to treat the floating material having a high fat and oil content.

DISCLOSURE

Technical Problem

Accordingly, the present invention has been made to solve the above-mentioned problems occurring in the prior art, and a object of the present invention is to provide a method for solidifying a floating fat and oil in a food waste water in that it induces even mixing and aging of a floating fat and oil and an alkali powder in the inside of a mixer for mixing the floating fat and oil floated in a high concentrated organic wastewater of a food waste disposal plant with the alkali powder to be solidified, a mixing and cooling device for second mixing and naturally cooling them, and a mixing and aging device for third inducing the mixing and aging thereof to be evenly mixed, so that a solidified pellet having a structurally fine tissue is obtained, thereby maximizing the utilization of the fuel of the renewable energy through the solidified pellet and easily performing the solidification of the floating fat and oil floated in the waste water and the separation with the moisture; the mixer, the mixing and cooling device, and the mixing and aging device for inducing the mixing and aging thereof are formed in a horizontally direction respectively, so that the mixing and aging materials are is transferred in the horizontal direction and the moisture thereof is evenly evaporated through the principle of air circulation and air dynamics; at this time, on one side of the upper side of the mixer, the mixing and cooling device, and the mixing and aging device, a ventilator for inducing a sweating is connected to a ventilation pipe, thereby maximizing the evaporation effect of the moisture of the mixing and aging materials and easily discharging the moisture thereof to outside; a double fine cutting screw and a grinding roller, in which a plurality of blades is protruded, are formed inside the mixer, the mixing and cooling device, and the mixing and aging device respectively, so that the mixing materials are finely pulverized in order to be mixed and evenly and uniformly mixed and aged, thereby improving the pulverization efficiency thereof; it is dried through the indirect heating of a hot air at a predetermined temperature supplied through hot air inflow pipes, thereby preventing a moisture condensation phenomenon; it induces the flow of the air in the horizontal direction, thereby more improving the drying efficiency of the pellets without a separate electric heating appliance etc.; and a discharging adjustable valve is formed at the outlet of the drying device, so that the drying speed and time of the dried pellets, which are discharged from the drying device, can be freely adjusted.

Technical Solution

In order to accomplish this object, there is provided a method for solidifying a floating fat and oil in a food waste water comprising a flowing step of flowing a floating fat and oil floated in a high-concentrated waste water of a food waste disposal plant into a storage tank through a suction pump; a mixing step of mixing the floating fat and oil having a high content of water with an alkali powder supplied from an alkali powder tank in a mixer to be solidified; pulverizing and forming step of pulverizing the floating fat and oil completely mixed in the mixer to a predetermined size, flowing it into a forming device, and forming it to a predetermined size; a drying step of flowing the floating fat and oil completely formed in the forming device into a drying device and drying it at a predetermined temperature; and a solidified pellet storing step of transferring pellets completely dried in the drying device through a belt conveyor to be dried and storing the pellets in a pellet storage tank, comprising the steps of: first mixing the floating fat and oil with the alkali powder by means of the mixer while being pulverized at high speed of 300~500 rpm to a size of 5 mm or less through a double fine cutting screw connected to a driving motor, the alkali powder of 5 to 15 wt % being put into the floating fat and oil of 85 to 95 wt % so as to induce an exothermic reaction to have 80° C. or more by reacting between the alkali powder and the water of the floating fat and oil, the moisture being partially evaporated by means of an exothermic reaction so as to remove it to outside through an upper portion of the mixer installed in the horizontal direction; flowing the first mixture into a mixing and cooling device installed in the horizontal direction, the size of the first mixture being two times larger than that of the mixer in terms of volume; inducing an even mixing and aging of the floating fat and oil and the alkali powder for 5~15 minutes through the low speed of a mixing and transferring screw to perform a second mixing, the moisture being removed to outside through the upper portion of the mixing and cooling device and the second mixture being naturally cooled at 40~60° C. and a grinding roller, in which a plurality of blades is protruded, is formed on the middle portion of the inside of the mixing and cooling device so as to pulverize to a small size of 3 mm or less; flowing the second mixture into a mixing and aging device installed in the horizontal direction, the size of the second mixture being two times larger than that of the mixing and cooling device; inducing a third mixing and aging of the second mixture, the second mixture slowly transferred in the horizontal direction for 5~15 minutes through a double blade which is formed inside the mixing and aging device and a grinding roller, in which a plurality of blades is protruded, is formed on the middle portion of the inside of the mixing and aging device, so as to pulverize the third mixture to a size of 2 mm or less; flowing the third mixture into a forming device having a plurality of through holes with a size of 5~10 mm, the third mixture, which passes through the through holes, being formed to a size of 5~10 mm by a self-load without a separate pressure and cut in a predetermined length so as to form pellets; flowing the pellets completely formed inside the forming device by the self-load into a drying device, the pellets being dried through the indirect heating of a hot air with the temperature of 40~60° C. supplied through hot air inflow pipes and indirectly heated for 2~4 hours while inducing the flow of air in the horizontal direction in order to prevent a moisture condensation phenomenon, thereby the content of water of the pellets is less than 10%; and adjusting a drying speed and time of the dried pellets, which are discharged from the drying device through a discharging adjustable valve formed at the lower portion of the outlet of the drying device, thereby adjusting the moisture content thereof according to the need of the final drying product and moving the dried and solidified pellet to the pellet storage tank.

Also, a ventilator is connected to a ventilation pipe on one side of the upper side of the mixer, the mixing and cooling device, and the mixing and aging device so as to induce an even evaporation of the moisture of the mixture and the mixing and aging materials and an evaporation sweating of the moisture.

Also, in case of a part of the pellet dried in the drying device, in order to control the percentage of water content thereof, after it is flowed into the pulverizing device through a conveyor installed in the lower portion of the drying device to be pulverized, the pulverized powder is flowed into the power storage tank and the powder of the powder storage tank is selectively transferred to the inside of the mixing and aging device to be mixed.

Also, a screen and a hopper having a paddle therein and connected to a transferring screw at a lower portion thereof capable of mixing the mixing and aging materials of a diameter 5 mm or less to be passed through are formed on the upper portion of the forming device, so that the mixing and aging materials, which are finely cut, can be smoothly flowed into the forming device and the length of the forming device having the plurality of the through holes is 50 cm so as to mold the mixing and aging materials by the self-load, thereby cutting the molded pellet by the self-load.

Also, a hot air inflow pipes for drying the molded pellets by means of the indirect heating are formed the upper portion, the middle portion, and the lower portion of the drying device respectively, so that the hot airs can be uniformly moved in the horizontal direction inside the drying device and the pellets, which are dried in the drying device, are moved to the lower portion thereof by the self-load to be discharged.

Advantageous Effects

According to the method for solidifying the floating fat and oil in the food waste water, there is an effect in that it induces even mixing and aging of the floating fat and oil and the alkali powder in the inside of the mixer for mixing the floating fat and oil floated in a high concentrated organic wastewater of the food waste disposal plant with the alkali powder to be solidified, the mixing and cooling device for second mixing and naturally cooling them, and the mixing and aging device for third inducing the mixing and aging thereof to be evenly mixed, so that the solidified pellet having the structurally fine tissue is obtained, thereby maximizing the utilization of the fuel of the renewable energy through the solidified pellet and easily performing the solidification of the floating fat and oil floated in the waste water and the separation with the moisture; the mixer, the mixing and cooling device, and the mixing and aging device for inducing the mixing and aging thereof are formed in the horizontally direction respectively, so that the mixing and aging materials are is transferred in the horizontal direction and the moisture thereof is evenly evaporated through the principle of air circulation and air dynamics; at this time, on one side of the upper side of the mixer, the mixing and cooling device, and the mixing and aging device, the ventilator for inducing a sweating is connected to the ventilation pipe, thereby maximizing the evaporation effect of the moisture of the mixing and aging materials and easily discharging the moisture thereof to outside; the double fine cutting screw and a grinding roller, in which the plurality of the blades is protruded, are formed inside the mixer, the mixing and cooling device, and the mixing and aging device respectively, so that the mixing materials are finely pulverized in order to be mixed and evenly and uniformly mixed and aged, thereby improving the pulverization efficiency thereof; it is dried through the indirect heating of a hot air at a predetermined temperature supplied through hot air inflow pipes, thereby preventing the moisture condensation phenomenon; it induces the flow of the air in the horizontal direction, thereby more improving the drying efficiency of the pellets without the separate electric heating appliance etc.; and a discharging adjustable valve is formed at the outlet of the drying device, so that the drying speed and time of the dried pellets, which are discharged from the drying device, can be freely adjusted.

Also, since the ocean dumping is prohibited in case of the floating fat and oil having the moisture and it is impossible to treat the fat and oil having a high content of water in the waste disposal plant, it costs the tremendous processing expense of the floating fat and oil. On the contrary, in the present invention, it is easily solidified so as to utilize it as the recycling energy, thereby rendering the economical effect.

Although a preferred embodiment of the present invention has been described for illustrative purposes, those skilled in the art will appreciate that various modifications, additions and substitutions are possible, without departing from the scope and spirit of the invention as disclosed in the accompanying claims.

BRIEF DESCRIPTION OF THE DRAWINGS

The above and other objects, features and advantages of the present invention will be more apparent from the following detailed description taken in conjunction with the accompanying drawings, in which:

FIG. 1 is a flow chart illustrating a method for solidifying a floating fat and oil in a food waste water according to a present invention.

BEST MODE

Mode for Invention

Hereinafter, an exemplary embodiment of the present invention will be described in detail with reference to the accompanying drawings.

FIG. 1 is a flow chart illustrating a method for solidifying a floating fat and oil in a food waste water according to a present invention. The floating fat and oil having a plenty of moisture is collected from a high concentrated organic wastewater of a food waste disposal plant through a scrapper and then, flowed into a storage tank having a lower separating manner of a cone type through a suction pump to be stored therein. The oil having a plenty of moisture, which is stored in the storage tank, is flowed into a mixer, which is formed in a horizontal direction, through a volumetric pump. At this time, an alkali powder is flowed into the mixer from an alkali powder tank, which is formed at one side of the storage tank and then, the floating fat and oil is pulverized at high speed of 300~500 rpm to a size of 5 mm or less through a double fine cutting screw, which is connected to a driving motor and firstly mixed with the alkali power.

In case of the alkali power mixed with the floating fat and oil, the alkali powder of 5 to 15 wt % is put into the floating fat and oil of 85 to 95 wt %. Where the alkali powder is below 5 weight %, it is very difficult to solidify the floating fat and oil mixed with it. Where the alkali powder is more than 15 weight %, since the alkali powder mixed with the floating fat and oil is large, the solidification thereof is fast, while the solidified mixture of the floating fat and oil is easily broken under the influence of a high heat owing to the reaction of the alkali powder and the moisture of the floating fat and oil, so that it is impossible to mold them. Also, since the high-priced alkali powder is used, it causes the increase of the preparing cost by the solidification of the floating fat and oil. Accordingly, according to the present invention, it is preferred that the alkali powder of 5 to 15 wt % is put into the floating fat and oil of 85 to 95 wt %.

Also, since the floating fat and oil is pulverized in the mixer at high speed of 300~500 rpm to a size of 5 mm or less through the double fine cutting screw, the mixing with the alkali powder is easily conducted.

In this way, the alkali powder is mixed with the floating fat and oil inside the mixer, so that it induces the exothermic reaction to have 80° C. or more temperature by reacting between the alkali powder and the water of the floating fat and oil. The moisture of the floating fat and oil is partially evaporated by means of the exothermic reaction, so that the alkali powder and the floating fat and oil mixture is transferred in the horizontal direction through the mixer installed in the horizontal direction, thereby evenly evaporating the moisture thereof through the principle of air circulation and air dynamics. At this time, on one side of the upper side of the mixer, a ventilator for inducing a sweating is connected to a ventilation pipe, thereby maximizing the evaporation effect of the moisture of the mixture.

As described above, the first mixture of the alkali powder and the floating fat and oil is over two times larger than the mixer in terms of volume and flowed into a mixing and cooling device installed in the horizontal direction, so that it induces the even mixing and aging of the floating fat and oil and the alkali powder for 5~15 minutes through the low speed of a mixing and transferring screw located inside the mixing and cooling device to perform a second mixing. At this time, the first mixture is expanded and mixed through the process of slowly aging for 5~15 minutes inside the mixing and cooling device, so that the volume of the mixing and cooling device is over two times larger than that of the mixer of going through the first mixing. As described above, through the aging process of the floating fat and oil and the alkali powder, it is evenly mixed and becomes the mixture having a structurally fine tissue.

Also, the moisture generated during the second mixing and aging process is transferred in the horizontal direction through the upper portion of the mixing and cooling device installed in the horizontal direction and evenly evaporated through the air circulation. The evaporated moisture is effectively removed through the ventilator and the ventilation pipe, which is formed on one side of the upper portion of the mixing and cooling device. At this time, the second mixture is naturally cooled at 40~60° C. Here, a grinding roller, in which a plurality of blades is protruded, is formed on the middle portion of the inside of the mixing and cooling device, so that the second mixture is pulverized to a small size of 3 mm or less, thereby evenly and uniformly mixing and aging the mixing and aging materials.

Continuously, the second mixed and aged mixture is over two times larger than the mixing and cooling device in terms of volume and flowed into a mixing and aging device installed in the horizontal direction, so that it induces a third mixing and aging in an even status while the second mixing and aging materials flowed into the mixing and aging device are slowly transferred in the horizontal direction for 5~15 minutes through a double blade which is formed inside the mixing and aging device. Here, a grinding roller, in which a plurality of blades is protruded, is formed on the middle portion of the inside of the mixing and aging device, so that the third mixture is minutely pulverized to a size of 2 mm or less.

It induces the slow and even mixing and aging for 5~15 minutes inside the mixing and aging device, so that the floating fat and oil and the alkali powder are evenly mixed, thereby obtaining a solidified pellet having a structurally fine tissue. Accordingly, it maximizes the utilization of the fuel of the renewable energy through the solidified pellet. Here, like the mixing and cooling device, the moisture generated during the third mixing and aging process is transferred in the horizontal direction through the upper portion of the mixing and aging device installed in the horizontal direction and evenly evaporated through the air circulation. The evaporated moisture is effectively removed through the ventilator and the ventilation pipe, which is formed on one side of the upper portion of the mixing and aging device.

In addition to this, the mixing materials and the mixing and aging materials are finely pulverized to sizes of 5 mm, 4 mm, and 3 mm in order by means of the double fine cutting screw and a grinding roller, in which a plurality of blades is protruded, formed inside the mixer, the mixing and cooling device, and the mixing and aging device respectively, so that the mixing materials and the mixing and aging materials are evenly and uniformly mixed and aged, thereby improving the pulverization efficiency thereof.

In the meantime, the third mixing and aging materials are flowed into a forming device having a plurality of through holes with a size of 5~10 mm, passes through the through holes and then, formed to a size of 5~10 mm by the self-load without a separate pressure and cut in a predetermined length by the self-load so as to form pellets.

At this time, a screen and a hopper having a paddle therein and connected to a transferring screw at a lower portion thereof capable of mixing the mixing and aging materials of a diameter 5 mm or less to be passed through are formed on the upper portion of the forming pellet device, the mixing and aging materials of a diameter 5 mm or more, which are non-cut and hard to form, can be filtered out, thereby easily forming by the self-load inside the forming device. Also, the mixing and aging materials, which are finely cut, can be smoothly flowed into the forming device through the paddle and transferring screw located in the hopper.

In order to mold the mixing and aging materials flowed into the forming device by the self-load, the length of the forming device having the plurality of the through holes is 50 cm. Accordingly, the mixing and aging materials is smoothly molded by the self-load while being passed through the long through holes within the forming device. The pellets, in that the molding is completed, are cut at a lower outlet of the forming device in a predetermined length by the self-load.

As described above, the pellets, in that the molding is completed inside the forming device by the self-load, are flowed into a drying device and then, dried through the indirect heating of a hot air with the temperature of 40~60° C. supplied through hot air inflow pipes, so that it is indirectly heated for 2~4 hours while inducing the flow of air in the horizontal direction in order to prevent the moisture condensation phenomenon, thereby the content of water of the pellets is less than 10%.

At this time, the hot air inflow pipes for drying the pellets by means of the indirect heating are formed the upper portion, the middle portion, and the lower portion of the drying device respectively, so that the hot airs can be uniformly moved in the horizontal direction inside the drying device. The pellets, which are dried in the drying device, are moved to the lower portion thereof by the self-load to be discharged, thereby more improving the drying efficiency of the pellets without a separate electric heating appliance etc. and adjusting the moisture content according to the need of the final drying product.

Also, a discharging adjustable valve is formed at the lower portion of the outlet of the drying device, so that the drying speed and time of the dried pellets, which are discharged from the drying device, are freely adjusted, thereby moving the dried and solidified pellet to the pellet storage tank.

On the other hand, in case of a part of the pellet dried in the drying device, in order to control the percentage of water content thereof, after it is flowed into the pulverizing device through a conveyor installed in the lower portion of the drying device to be pulverized, the pulverized powder is flowed into the power storage tank to be temporarily stored. Also, the powder of the powder storage tank is selectively transferred to the inside of the mixing and aging device and again mixed, aged, and dried, thereby preparing the solidified pellet having the ultralow percentage of water content.

INDUSTRIAL APPLICABILITY

The invention can be applied to a food company or slaughterhouse of treating the food waste having a plenty of floating fat and oil having a high content of water as well as various treating companies such as a fertilizer company or a fodder company capable of retreating the food waste.

What is claimed is:
1. A method for solidifying a floating fat and oil in a food waste water comprising:
transferring a floating fat and oil floated in a high-concentrated waste water of a food waste disposal plant into a storage tank through a suction pump;
mixing the floating fat and oil having a high content of water with an alkali powder supplied from an alkali powder tank in a mixer to have a first mixture, wherein,
the first mixture is pulverized at high speed of 300~500 rpm to a size of 5 mm or less via a double fine cutting screw connected to a driving motor installed in the mixer, and
the floating fat and oil of 85 to 95 wt % is mixed with the alkali powder of 5 to 15 wt % so that 80° C. or more of an exothermic reaction is induced, wherein moisture in the first mixture is partially evaporated by the exothermic reaction;
transferring the first mixture into a mixing and cooling device, wherein, in the mixing and cooling device, wherein,
the first mixture is mixed at a low speed and aged for 5~15 minutes to have a second mixture,
the second mixture is cooled at 40~60° C., and
the second mixture is pulverized to a size of 3 mm or less via a grinding roller having a plurality of protrude blades installed in the middle portion of the inside of the mixing and cooling device;
transferring the second mixture into a mixing and aging device, wherein,
the second mixture is transferred in a horizontal direction for 5~15 minutes through a double blade formed inside the mixing and aging device to have a third mixture, and
the third mixture is pulverized to a size of 2 mm or less via a grinding roller having a plurality of protrude blades installed in the middle portion of the inside of the mixing and aging device,
wherein the mixer, the mixing and cooling device, and the mixing and aging device are formed in a horizontal direction, respectively;
transferring the third mixture into a forming device having a plurality of through holes with a size of 5~10 mm, the third mixture, which passes through the through holes, being formed to a size of 5~10 mm by a self-load without a separate pressure to form pellets; and
transferring the pellets into a drying device, wherein,
the pellets are dried for 2~4 hours through indirect heating of hot air having temperature of 40~60° C. supplied via hot air inflow pipes so that moisture contained in the pellets is less than 10%,
the hot air inflow pipes are installed at an upper, a middle, and a lower portions of the drying device, and
a discharging adjustable valve formed at the lower portion of an outlet of the drying device so that a drying speed and time of the dried pellets are adjusted.

2. The method for solidifying a floating fat and oil in a food waste water as claimed in claim 1, wherein a ventilator is connected to a ventilation pipe on one side of the upper side of the mixer, the mixing and cooling device, and the mixing and aging device so as to induce an even evaporation of the moisture of the first, second, and third mixtures and the mixing and aging materials and an evaporation sweating of the moisture.

3. The method for solidifying a floating fat and oil in a food waste water as claimed in claim 1, wherein, in case of a part of the pellet dried in the drying device, in order to control the percentage of water content thereof, after the part of the pellet is flowed into a pulverizing device through a conveyor installed in the lower portion of the drying device to be pulverized, the pulverized powder is flowed into the power storage tank and the powder of the powder storage tank is selectively transferred to the inside of the mixing and aging device to be mixed.

4. The method for solidifying a floating fat and oil in a food waste water as claimed in claim 1, wherein a screen and a hopper having a paddle therein and connected to a transferring screw at a lower portion thereof capable of mixing the mixing and aging materials of a diameter 5 mm or less to be passed through are formed on the upper portion of the forming device, so that the mixing and aging materials, which are finely cut, are smoothly flowed into the forming device and the length of the forming device having the plurality of the through holes is 50 cm so as to mold the mixing and aging materials by the self-load, thereby cutting the molded pellet by the self-load.

5. The method for solidifying a floating fat and oil in a food waste water as claimed in claim 1, wherein a hot air inflow pipes for drying the molded pellets by means of the indirect heating are formed the upper portion, the middle portion, and the lower portion of the drying device respectively, so that the hot air is uniformly moved in the horizontal direction inside the drying device and the pellets, which are dried in the drying device, are moved to the lower portion thereof by the self-load to be discharged.

* * * * *